(12) United States Patent
Pinto

(10) Patent No.: US 6,665,167 B2
(45) Date of Patent: *Dec. 16, 2003

(54) METHOD FOR ENERGY EXTRACTION-I

(76) Inventor: Fabrizio Pinto, 639 W. Foothill Blvd., Monrovia, CA (US) 91016

( * ) Notice: Subject to any disclaimer, the term of this patent is extended or adjusted under 35 U.S.C. 154(b) by 0 days.

This patent is subject to a terminal disclaimer.

(21) Appl. No.: 10/222,591

(22) Filed: Aug. 16, 2002

(65) Prior Publication Data

US 2003/0090852 A1 May 15, 2003

Related U.S. Application Data

(62) Division of application No. 09/578,638, filed on May 25, 2000, now Pat. No. 6,477,028.
(60) Provisional application No. 60/135,868, filed on May 25, 1999.

(51) Int. Cl.$^7$ .......................... H02N 11/00; H02M 1/00
(52) U.S. Cl. ...................... 361/233; 361/226; 363/178; 327/603; 318/16; 318/555; 318/558; 307/151
(58) Field of Search ................................ 361/233, 226; 363/178; 327/603; 318/16, 555, 558; 307/151

(56) References Cited

U.S. PATENT DOCUMENTS 6,477,028 B1 * 11/2002 Pinto .......................... 361/233

* cited by examiner

Primary Examiner—Nikita Wells
(74) Attorney, Agent, or Firm—DeMont & Breyer, LLC

(57) ABSTRACT

In some embodiments, the illustrative method defines an engine cycle comprising several state changes that allow for a net gain of energy from an underlying source force field. The potential for a net energy gain via the method results from the discovery that a Casimir force system can be rendered non-conservative. This is done by appropriately altering one or more of a variety of physical factors that affect the Casimir force, or by altering any of a variety of environmental factors that affect such physical factors. In various embodiments, the extracted energy is stored, used to power energy-consuming devices or used to actuate a micromechanical device. In one embodiment, the method is implemented using an energy extraction apparatus that comprises two spaced Casimir force-generating boundaries that are operatively coupled to an energy transformation system. The energy transformation system includes a first device that is operable to alter at least one physical factor of the system. The energy transformation system also includes a second device that is operable to change the distance between the two Casimir force-generating boundaries, and further operable to maintain the distance between the boundaries while the first device alters the physical factor.

21 Claims, 6 Drawing Sheets

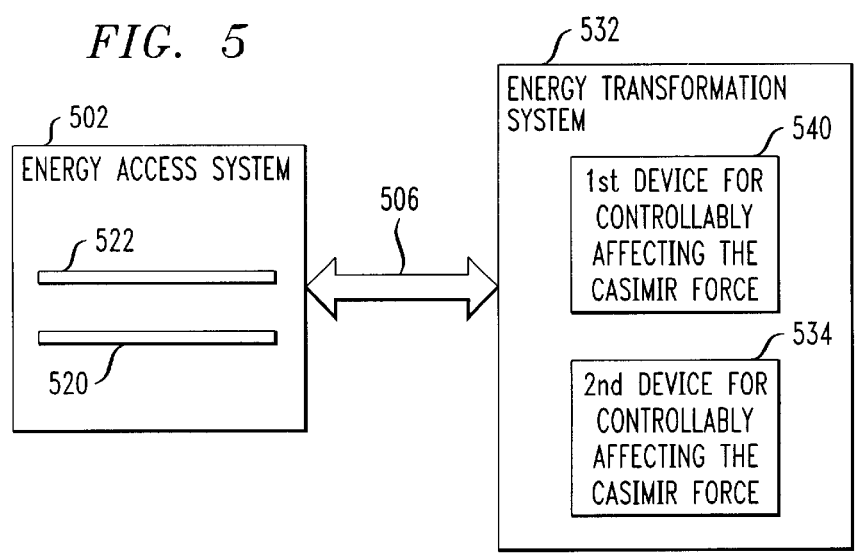
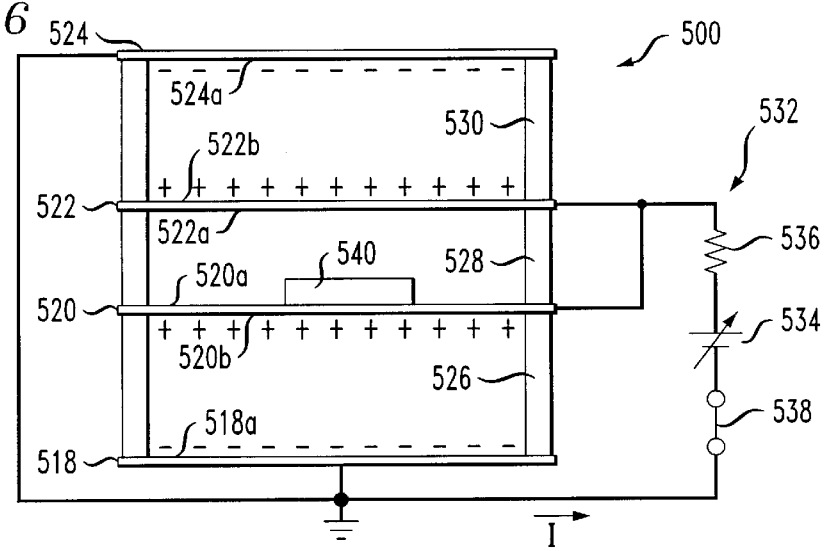
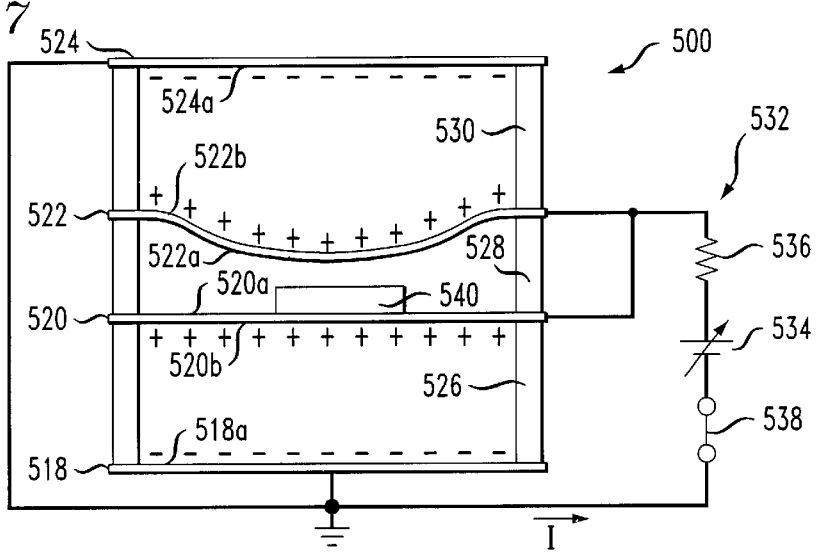

US 6,665,167 B2

METHOD FOR ENERGY EXTRACTION-I

STATEMENT OF RELATED APPLICATIONS

This application is a division of and claims priority of U.S. Pat. App. No. 09/578,638 filed May 25, 2000, now U.S. Pat No. 6,477,028, now allowed which, in turn, claims priority of U.S. Pat. App. No. 60/135,868 filed May 25, 1999.

FIELD OF THE INVENTION

The present invention relates generally to the extraction of energy from a source force field, such as the quantum electromagnetic field.

BACKGROUND OF THE INVENTION

Three hundred years ago, it was believed that if all matter were removed from a region of space, a completely empty volume—a vacuum—results. One hundred years ago, it was known that even if all matter were removed from a region of space, that region is not truly empty because it still would contain thermal radiation. At that time, however, it was incorrectly believed that a vacuum could still be created by removing the thermal radiation, such as by cooling the region of space to absolute zero.

More recently, theory has predicted and experimentation has shown that a non-thermal radiation is present everywhere in the universe—even in regions that are otherwise devoid of matter and thermal radiation. This non-thermal radiation is believed to result from random fluctuations occurring at the quantum level that result in a continual creation and destruction of virtual particles. This radiation is often referred to as a "zero point field," or by the acronym "ZPF," and the energy that is associated with the field is referred to as "zero point energy," "vacuum energy," or simply by the acronym "ZPE."

In 1948, Hendrik B. J. Casimir theorized that two perfectly conducting, neutral planes that are situated in parallel relation to one another give rise to a mutually attractive force. This force, since referred to as "the Casimir force," results from the effect that the two planes have on the vacuum energy of a source field, such as an electromagnetic field, between the planes.

The Casimir force is believed to arise solely from the aforedescribed quantum-level activity. The presence of Casimir's two planes, or, in practical applications, two plates, restricts the allowed modes of oscillation of the random fluctuations in the quantum electromagnetic field. In other words, the presence of the plates alters the boundary conditions of the electromagnetic field from free-field conditions. Consequently, the vacuum electromagnetic energy density in the space between the plates is less than the energy density outside of this space (i.e., the number of virtual particles per unit volume in the space between the plates is less than the number of virtual particles per unit volume outside of this space). This difference or gradient in energy density gives rise to a force (i.e., the Casimir force) that pushes the plates together.

While the Casimir force is "real" in the sense that is observable, the quantum electrodynamic ("QED") theory described above is not the only theory that adequately accounts for its existence. In particular, stochastic electrodynamics ("SED"), which provides a different interpretation, yields the same predictions.

The magnitude of the Casimir force, $F_C$, per unit area is given by the expression:

$$F_C(s) = (\pi^2/240) \cdot (h^* c / s^4) \quad [1]$$

where: · means "multiply;"

$h^* = h/(2\pi)$ h is Planck's constant;

c is the speed of light in a vacuum;

s is the separation between the two conducting surfaces.

It is clear from expression [1] that as s approaches 0, the Casimir force $F_C(s)$ becomes large. In fact, the Casimir force per unit area between two plates separated by a distance s of about 0.1 microns is equivalent to the electrostatic force per unit area between the same two plates in the presence of a potential difference of about 100 millivolts.

ZPE is expected to exhibit infinite energy density and to be universally present, and might therefore be a limitless source of energy. This, not surprisingly, has tantalized researchers and spawned several efforts dedicated to ZPE research and commercialization. Such efforts notwithstanding, investigators have not as yet developed devices and methods that are suitable for commercially exploiting ZPE.

SUMMARY OF THE INVENTION

Some embodiments of a method in accordance with the present invention define an engine cycle comprising several state changes that enable a net gain or recovery of energy that is accessed via Casimir force-generating boundaries (e.g., plates, etc.).

One illustrative embodiment of a method for energy conversion/recovery in accordance with the present teachings comprises:

altering a physical factor that affects the Casimir force between two spaced Casimir force-generating boundaries;

changing the distance by which the two spaced Casimir force-generating boundaries are separated;

re-altering the physical factor to return it to its former value; and returning the separation distance between the boundaries to its original value.

In one embodiment of the illustrative method, the altered physical factor is the concentration of free charge carriers in the Casimir force-generating boundaries. One way to alter the concentration of free charge carriers is to illuminate at least one of the Casimir force-generating boundaries (e.g., plates) with photons. Another is to raise the temperature of such boundaries and yet another is to inject charge into at least one of the Casimir force-generating boundaries.

In some embodiments, the illustrative method includes a step of storing the energy accessed via Casimir force-generating boundaries after it is suitably transformed. In other embodiments, the method includes a step of delivering energy accessed via Casimir force-generating boundaries to other electrical consumers after it is suitably transformed. In still further embodiments, the method includes a step of actuating a micromechanical device with the energy accessed via the present method.

An illustrative apparatus for carrying out the inventive method comprises, in one embodiment, a system for accessing zero-point energy (e.g., two Casimir force-generating boundaries) that is operatively coupled to an energy transformation system. In some embodiments, the energy transformation system includes a first device that is operable to alter at least one physical factor of the system, and a second device that is operable to change a distance between the Casimir force-generating boundaries. The first and second devices advantageously operate independently of each other such that, at the same time, the physical factor can be affected and spacing between the boundaries can be controlled.

The structure of the energy transformation system varies as a function of the nature of the energy transformation (e.g., to electrical energy for storage, to electrical energy for direct use, to mechanical/kinetic energy for actuation, etc.).

Underlying the illustrative engine cycle, methods and apparatuses described herein is a discovery that a Casimir force system can be rendered non-conservative by appropriately altering one or more physical factors that affect the Casimir force, or by altering one or more environmental factors that affect such physical factors.

More particularly, it has been discovered that by altering a physical factor that affects the Casimir force, an apparatus can be created in which more energy is expended by the Casimir force in drawing the Casimir force-generating boundaries together than it takes to pull them apart. As a consequence, when such boundaries are pulled apart, a net energy transfer results. The cycle can be repeated as long as the apparatus lasts.

Unlike the gravitational force, the value of which does not depend on the properties of a mass being acted upon, the Casimir force depends upon a variety of physical factors that can be changed if a specific energy price is paid. When such a penalty is smaller, in absolute terms, than the total work done by the Casimir force in a cycle, a net amount of energy accessed via Casimir force-generating boundaries is available for recovery. When the penalty is larger, in absolute terms, than the total work done by the Casimir force in a cycle, then the present methods and apparatuses function simply to transform energy (i.e., as a transducer), but yield no net gain of energy.

Some embodiments of the present invention appear to contradict typical interpretations of the principle of conservation of energy but, in fact, do not. Energy accessed via Casimir force-generating boundaries is made available because of well-known energy conservation arguments, not in spite of them.

BRIEF DESCRIPTION OF THE DRAWINGS

FIG. 5 depicts, figuratively, an illustrative embodiment of energy extraction apparatus in accordance with the present teachings.

FIG. 6 depicts an embodiment of the illustrative energy extraction apparatus depicted in FIG. 5. The apparatus is depicted at the end of a first state change in accordance with the illustrative cycle of FIG. 2 and at the end of a first step in accordance with the illustrative method of FIG. 3.

FIG. 7 depicts the energy extraction apparatus shown in FIG. 6, but depicts the apparatus at the end of a second state change in accordance with the illustrative cycle of FIG. 2 and at the end of a second step in accordance with the illustrative method of FIG. 3.

DETAILED DESCRIPTION OF THE INVENTION

Figure 1:
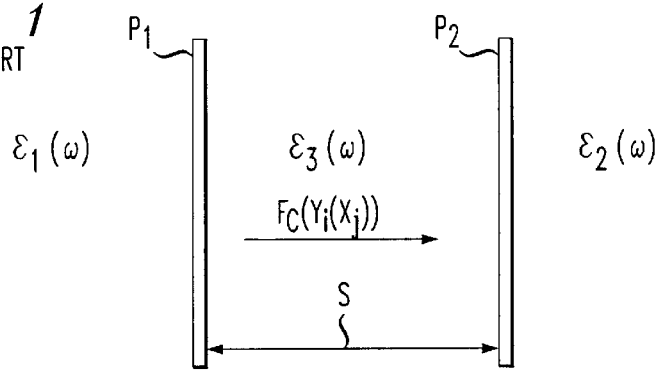
FIG. 1 depicts a well-known Casimir force-generating system.

As stated in the Background section, the Casimir force arises (in at least one interpretation) from the imposition of boundary conditions on a source force field, such as the quantum electromagnetic field, the "strong" force field, the gravitational force field, and the "weak" force field. Although the illustrative methods and apparatuses described herein are directed to systems in which the Casimir force arises from interactions with the quantum electromagnetic field, the present invention is also applicable to systems in which the Casimir force arises from interactions with the "strong" force field, the gravitational force field, and the "weak" force field.

It will be understood that the illustrative embodiments of the present invention do not, literally, "change" or "transform" zero point energy to another form of energy. In particular, in accordance with some embodiments of an illustrative apparatus in accordance with the present invention, Casimir force-generating boundaries interact or cooperate with an energy transformation system. Such interactions include, for example, moving a linkage that engages another device or affecting an electrostatic field. To the extent such interactions occur, zero-point energy is thus transformed or changed to another form of energy—be it electrical, kinetic, etc.

As used in this Specification, the phrase "Casimir force-generating boundaries" means any object (mass) or force field that is capable of restricting the allowed modes of oscillation of random quantum-level fluctuations of a source force field or is otherwise capable of altering the boundary conditions of a source force field from free-field conditions. Such objects include, without limitation, plates, spheres, particles (even atomic and subatomic particles) and the like. Regarding force fields, any secondary force field (i.e., secondary with respect to a source force field) including, without limitation, an electromagnetic field, will interact with the source force field therefore altering the boundary conditions of the source force field from free-field conditions.

As used in this Specification, the phrase "energy accessed via Casimir force-generating boundaries" means energy (e.g., zero point energy) arising from a source force field (e.g., quantum electromagnetic field, etc.) that is manipulated via the Casimir force.

As used in this Specification, the phrases "net gain," "net exchange," and the term "recovery," when used in conjunction with the term "energy," mean that more energy is withdrawn from a system than is added thereto. The phrases "convert" or "conversion," when used in conjunction with the term "energy," mean that while energy accessed via Casimir force-generating boundaries is harnessed for use, no net gain of energy is realized via the present methods or apparatuses. As used in the Specification, the term "extraction," when used in conjunction with the term "energy," is meant to refer generally to both energy conversion and energy recovery, or to refer to either energy conversion and energy recovery.

The illustrative embodiments described herein are improvements on a simple well-known Casimir force-generating system, which is depicted in FIG. 1. In particular, FIG. 1 depicts two Casimir force-generating boundaries $P_1$ and $P_2$. Casimir force-generating boundaries $P_1$ and $P_2$ are separated by distance s. Casimir force-generating boundary $P_1$ is movable towards (and away from) Casimir force-generating boundary $P_2$.

As will be appreciated by those skilled in the art, when performing Casimir force calculations, Casimir force-generating boundaries $P_1$ and $P_2$ are considered to be slabs (typically dielectric) having "semi-infinite" thickness. Thus, for such calculations, Casimir force-generating boundary $P_1$ (shown as a thin plate-like structure in FIG. 1) is assumed to extend infinitely to the left (in FIG. 1), beginning at the surface of $P_1$ that is proximal to boundary $P_2$. Similarly, Casimir force-generating boundary $P_2$ extends infinitely to the right, beginning at the surface of $P_2$ that is proximal to boundary $P_1$.

Semi-infinite boundary $P_1$ has dielectric properties $\epsilon_1(\omega)$, and semi-infinite boundary $P_2$ has dielectric properties $\epsilon_2(\omega)$. The region between such boundaries is assumed to have dielectric properties $\epsilon_3(\omega)$. When performing quantitative estimates, it is typically assumed that $\epsilon_1(\omega)=\epsilon_2(\omega)$, and $\epsilon_3(\omega)=1$. Real plates, of course, have a non-infinite thickness. In many cases, the non-infinite thickness of real plates does not alter the quantitative results predicated on the assumption of semi-infinite boundaries.

It will be recognized that the Casimir force is a function of the specific geometry of the Casimir force-generating system. For example, in a system comprising two parallel boundaries as in FIG. 1, the Casimir force is attractive, but in a system comprising two halves of thin metal spherical shells the Casimir force is repulsive. In addition, changing the physical orientation of spaced boundaries $P_1$ and $P_2$ from "parallel" to "not parallel" will affect the Casimir force. And, of course, varying the angle defined between two non-parallel boundaries will vary the Casimir force. Also, bending a boundary (see, e.g., FIG. 6) will affect the Casimir force. The ability to extract energy, and the extent of such extraction in accordance with the present teachings, can, therefore, vary as a function of the specific arrangement used. It will be understood by those skilled in the art that embodiments of the present invention can use Casimir force-generating boundaries that are arranged in many specific arrangements other than in spaced, parallel relation as depicted in FIG. 1.

Referring again to FIG. 1, the Casimir force $F_C$ between $P_1$ and $P_2$ is depicted as an attractive force that is a function of:

1. the distance s between the surfaces;
2. every physical factor $Y_i$ that determines the dielectric and other properties (e.g., surface roughness, etc.) of the materials that comprise the system (e.g., such as the material that comprises boundaries $P_1$ and $P_2$)
3. every environmental factor $X_j$ that affects each physical factor $Y_i$.

Regarding item 2, the concentration of free carriers in $P_1$ and $P_2$ can, for example, affect the magnitude of the Casimir force $F_C$ (other parameters affecting the Casimir force are described later in this Specification).

With regard to item 3, environmental factors $X_j$ that affect physical factors $Y_i$, include, without limitation, the absolute temperature and the radiation density. And, the dependence of physical factors $Y_i$ is in addition to any intrinsic dependence of Casimir force $F_C$ on temperature. Thus, for any given arrangement of $P_1$ and $P_2$, the Casimir force $F_C$ is a function of the kind:

$$F_C = F_C(s; Y_1(X_1, X_2, \ldots); Y_2(X_1, X_2, \ldots); \ldots) \qquad [2]$$

Figure 2:
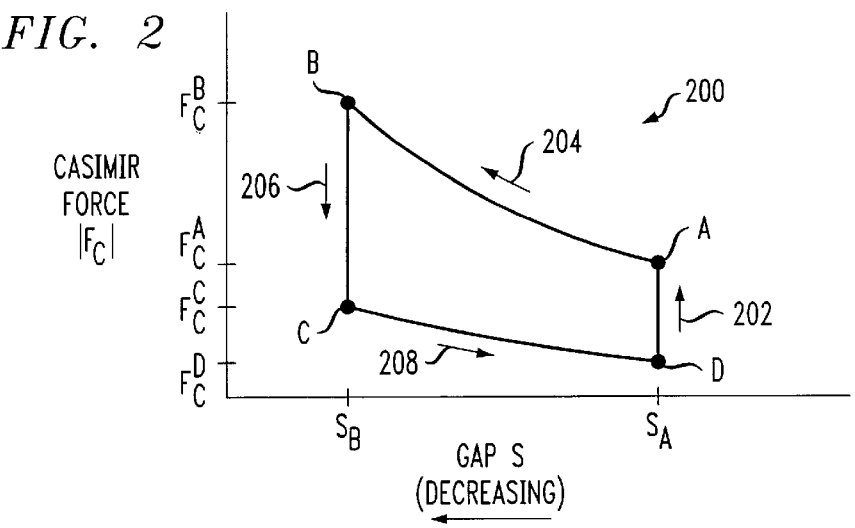
FIG. 2 depicts an illustrative engine cycle in accordance with the present teachings.
Figure 3:
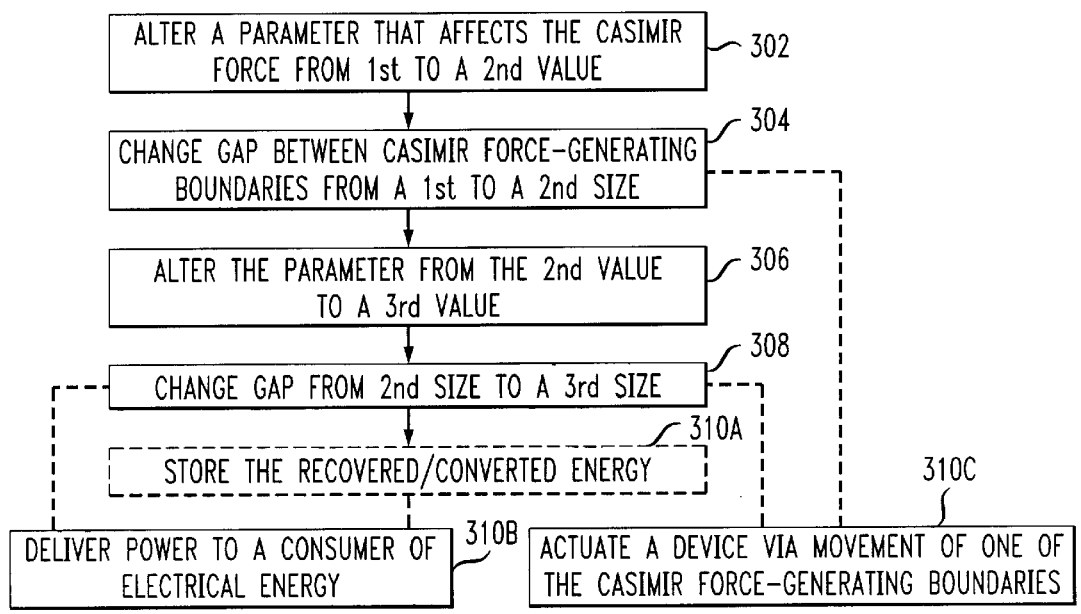
FIG. 3 depicts a method for energy extraction in accordance with the illustrated embodiment of the present invention.

FIG. 2 depicts a plot of illustrative "engine" cycle 200 for use in the extraction of energy accessed via Casimir force-generating boundaries in accordance with the present teachings. A method 300 based on engine cycle 200 is depicted in FIG. 3.

In FIG. 2, the abscissa (i.e., the x-axis) represents distance s between two Casimir force-generating boundaries $P_1$ and $P_2$ (see, FIG. 1), and the ordinate (i.e., the y-axis) represents the absolute value of the Casimir force $F_C$.

Illustrative engine cycle 200 is described, for pedagogical purposes, with reference to points A, B, C and D. It will be understood that such points are arbitrary and are used for purposes of illustration, not limitation. Moreover, it will be recognized that illustrative engine cycle 200 proceeds in either of two directions; that is, cycle 200 is reversible.

Illustrative engine cycle 200 comprises state changes 202, 204, 206 and 208 that affect the value of the Casimir force $F_C$. The description of cycle 200 begins at point A, wherein the Casimir force $F_C$ has a value $F_C^A$ that is a function of distance s, and all physical factors $Y_i(X_j)$:

$$F_C^A = F_C(s_A; Y_{1A}(X_{1A}, X_{2A}, \ldots); Y_{2A}(X_{1A}, X_{2A}, \ldots); \ldots) \qquad [3]$$

Beginning at point A, a state change or transformation 204 is effected that ends at point B. To implement state change 204 (i.e., A→B), the distance s between the Casimir force-generating boundaries is changed, but all other physical and environmental factors $Y_i(X_j)$ that affect the Casimir force are assumed to be substantially constant and equal to their value at point A. The change in distance s results, of course, in a change in the value of the Casimir force $F_C$ to:

$$F_C^B = F_C(s_B; Y_{1A}(X_{1A}, X_{2A}, \ldots); Y_{2A}(X_{1A}, X_{2A}, \ldots); \ldots) \qquad [4]$$

In state change 204 of illustrative cycle 200, the Casimir force $F_C$ increases since distance s is decreased, in accordance with expression [1].

At point B, another state change 206 occurs that ends at point C. As depicted in FIG. 2, during state change 206 (i.e., B→C), the Casimir force-generating boundaries (e.g., $P_1$ and $P_2$) are held substantially constant such that there is no change in distance s. Rather, a change is effected to physical factors $Y_i(X_j)$. Since, by definition, such physical factors affect the Casimir force, the change in physical factors $Y_i(X_j)$ changes the value of Casimir force $F_C$ to:

$$F_C^C = F_C(s_B; Y_{1C}(X_{1C}, X_{2C}, \ldots); Y_{2C}(X_{1C}, X_{2C}, \ldots); \ldots) \qquad [5]$$

In expression [5], distance s is referenced as "$s_B$" to emphasize that there is no change in this variable (i.e., $s_C=s_B$) during state change 206.

From point C, state change 208 occurs that ends at point D. In state change 208 (i.e., C→D), distance s is advantageously returned to its initial value (i.e., $s_D=s_A$), while all other parameters are held substantially constant. The value of Casimir force $F_C$ at point D due to state change 208 is:

$$F_C^D = F_C(s_A; Y_{1C}(X_{1C}, X_{2C}, \ldots); Y_{2C}(X_{1C}, X_{2C}, \ldots); \ldots) \quad [6]$$

Finally, in state change 202 that ends at point A (i.e., D→A), physical factors $Y_i(X_j)$ are advantageously restored to their initial values so that the value of Casimir force $F_C$ is given by:

$$F_C^A = F_C(s_A; Y_{1A}(X_{1A}, X_{2A}, \ldots); Y_{2A}(X_{1A}, X_{2A}, \ldots); \ldots) \quad [7]$$

The total energy, $W_{tot}$, available from engine cycle 200 is given by:

$$W_{tot} = (W_{DA} - W_{BC}) - W_{Cas} \quad [8]$$

where:
- $W_{BC}$ represents an amount of energy transferred from the system ($W_{BC}>0$) to create state change 206;
- $W_{DA}$ represents an amount of energy transferred to the system ($W_{DA}<0$) to create state change 202; and
- $W_{Cas}$ is the total mechanical work done by Casimir force $F_C$ over its closed path (i.e., the area enclosed by the curves that define cycle 200).

The quantity $W_{DA}$, or state change 202, represents the addition of energy to engine cycle 200. The quantity $W_{BC}$, or state change 206, represents the removal of energy from engine cycle 200. The removal or addition of such energy can be effected in numerous ways, a few of which are described later in this Specification.

The work done by the Casimir force, $W_{Cas}$, is given by:

$$W_{Cas} = \oint F_C(s; Y_i(X_j)) ds \quad [9]$$

Conventional energy conversion systems are conservative. As such, the total energy, $W_{tot}$, available from such systems is zero. In other words, the energy "out" of such systems is never greater than the energy that is added to such systems. In view of inefficiencies (e.g., friction, etc.) in practical systems, the useful energy out of a system is typically far less than the energy added to the system.

Consider, for example, a hydroelectric plant. Water cannot be transported back up to the top of a water falls without expending an amount of energy that is exactly equal to the kinetic energy obtained from that same water as it falls through turbines at the bottom of the water falls. This is well understood from the conservative properties of the gravitational force. Indeed, a substantial amount of experimentation has consistently shown that the gravitational constant does not depend on the chemical properties of the materials involved or on their temperature.

In contrast to the gravitational constant, every present theory of the Casimir force between two surfaces predicts a dependence on those very physical or environmental factors (see Expression [2], above). The tendency to liken the exchange of energy accessed via Casimir force-generating boundaries to that of hydroelectric energy production and other conventional forms of energy production is therefore inappropriate and incorrect.

The present inventor has discovered that by appropriately altering any of the physical factors $Y_i(X_j)$, a Casimir force system can be made non-conservative such that a net exchange of energy accessed via Casimir force-generating boundaries is possible, at least theoretically, such as via engine cycle 200. Unfortunately, the withdrawal and input of energy in conjunction with cycle 200 is not readily correlated to the various state changes the make up the cycle. The energy balance is determined by netting the various contributions as indicated in expression [8].

Considering the cycle in its entirety, however, the possibility for energy recovery is manifest. Engine cycle 200 creates a situation in which more work is required to draw the plates together (work done by the Casimir force) than to pull them apart (energy added to the system). And, when $(W_{DA}-W_{BC})-W_{Cas}<0$, there is a net recovery of energy—energy accessed via Casimir force-generating boundaries.

The difference in work described above is observable in FIG. 2. In particular, the change in the Casimir force is greater for the state change from point A to point B (work done by the Casimir force), wherein the distance between the plates is decreased, than for the state change from point C to point D, wherein the distance between the plates is increased (energy is supplied to pull the plates apart). Again, what makes this possible is a change in the value of physical factors $Y_i(X_j)$.

Specifically, at points A and B, the physical factors are defined by a first set of values (see expressions [3] and [4]), while at points C and D, the physical factors are defined by a second set of values (see expressions [5] and [6]). Since the Casimir force is a function of physical factors $Y_i(X_j)$, the change in value of the physical factors results in a difference in the Casimir force for a given distance between the Casimir force-generating boundaries (e.g., compare point D to point A). And, more importantly in the context of the present invention, the rate of change of the Casimir force is different.

Recovery of energy from a source energy field in accordance with illustrative engine cycle 200 is readily distinguishable from, for example, net gain of energy from an endless recycle of water from the bottom to the top of a water falls in Escher-like fashion. Again, unlike the gravitational force, the Casimir force depends upon a variety of physical factors that can be changed if a specific energy price is paid. When such a penalty is smaller, in absolute terms, than the total work done by the Casimir force in cycle 200, a net amount of energy accessed via Casimir force-generating boundaries is available for recovery.

This discovery appears to contradict typical interpretations of the principle of conservation of energy. In fact, it does not; energy accessed via Casimir force-generating boundaries is made available because of well-known energy conservation arguments, and not in spite of them. In fact, one or more well-established physical principles would have to be abandoned to reach the conclusion that, in the illustrative engine cycle 200 described herein, the Casimir force is conservative. In this context, it should be noted that the interpretative details will differ as between a QED-based description of the Casimir force and a SED-based description of the Casimir force.

Notwithstanding the foregoing, if a net gain of energy accessed via Casimir force-generating boundaries is not realized in practice due to technological or other unanticipated limitations, then engine cycle 200 provides energy conversion—that is, the cycle simply provides a transformation or a transducer function. For further theoretical treatment of the illustrative engine cycle described herein, including evaluation of the net energy gain, see, Pinto, F., "On the Engine Cycle of an Optically Controlled Vacuum Energy Transducer," Phys. Rev. B, vol. 60, issue 2, Dec. 1, 1999, p. 14740+, incorporated herein by reference.

FIG. 3 depicts a flow diagram of an illustrative method 300 for extraction of energy accessed via Casimir force-generating boundaries, in accordance with an illustrated embodiment of the present invention. Method 300 is based on illustrative engine cycle 200. The steps or operations of illustrative method 300 are ordered in a convenient manner for description. In particular, such steps are ordered to facilitate reference to the foregoing description of engine cycle 200. It will be appreciated from the description of engine cycle 200 that the order in which the various operations or steps of illustrative method 300 are carried out is arbitrary.

Like engine cycle 200 upon which it is based, method 300 will be described, as appropriate, in the context of a system having two Casimir force-generating boundaries, such as two plates, one fixed and the other movable, that are spaced from and in parallel relation to one another. For clarity of presentation, the basic operations of illustrative method 300 are described first. That description is followed by a description of the energy flow into and out of a system carrying out method 300.

Referring to FIG. 3, in a first operation 302 of method 300, at least one physical factor $Y_i$ that affects the value of the Casimir force is altered. Starting, for convenience, at point D in engine cycle 200, operation 302 corresponds to state change or transformation 202 (i.e., D→A state change). As described in further detail later in this Specification in conjunction with FIGS. 6–8, in some embodiments, operation 302 requires the addition of energy to the system.

Examples of physical factors that are altered in various embodiments include, without limitation, the concentration of free charge carriers and the location and strength of any absorption bands in the material comprising the Casimir force-generating boundaries. In other embodiments, altered physical factors include the material properties of the Casimir force-generating boundaries. Such material properties include, without limitation, dielectric properties and surface roughness.

An additional alterable physical factor $Y_i$ includes the specific geometry of the Casimir force generating system. For example, changing the physical orientation of spaced boundaries $P_1$ and $P_2$ from "parallel" to "not parallel" will affect the Casimir force. And, of course, varying the angle defined between two non-parallel boundaries will vary the Casimir force. Also, bending a boundary (see, e.g., FIG. 6) will affect the Casimir force.

The material(s) comprising the Casimir force-generating boundaries are suitably selected as a function of the physical factor(s) $Y_i$ chosen for alteration. For example, in an embodiment wherein the altered physical factor is the concentration of free charge carriers, the boundaries are advantageously semiconductors or compound semiconductors. Illustrative semiconductors (for embodiments wherein the altered physical factor is the concentration of free charge carriers) include, without limitation, silicon (Si), germanium (Ge), and compound semiconductors such as, without limitation, gallium arsenide (GaAs), indium gallium arsenide (InGaAs) and indium antimonide (InSb).

Moreover, in some embodiments, the boundaries comprise doped semiconductors and doped compound semiconductors, including, without limitation, phosphorus-doped silicon and indium antimonide that includes naturally occurring impurities. In some embodiments, dopants are selected based on their relative ease of ionization.

Figure 4:
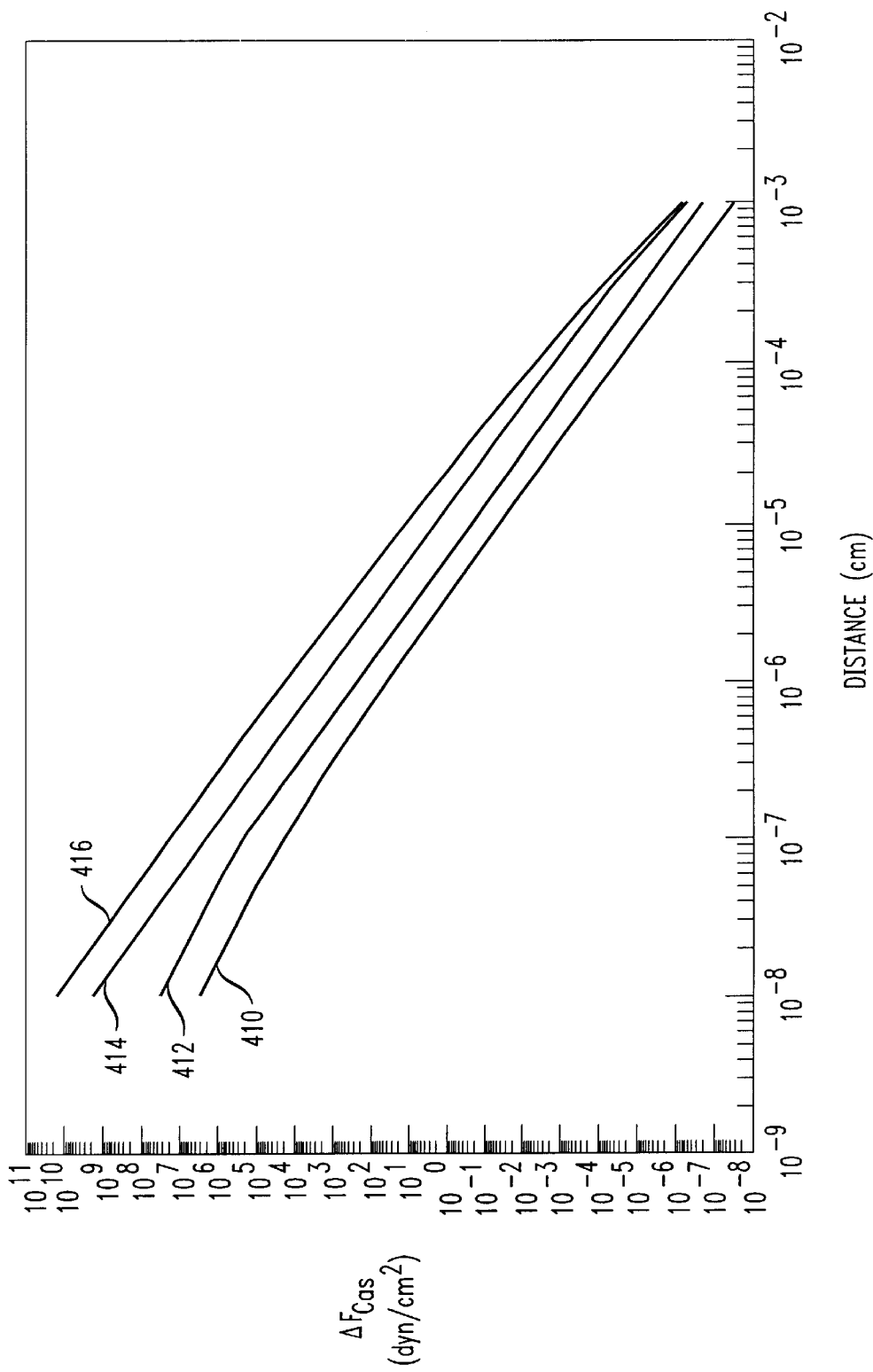
FIG. 4 depicts the dependence of the Casimir force on plate separation as a function of dopant level.

By way of illustration, FIG. 4 depicts plots showing the change in Casimir force due to a variation in free charge carriers, as effected via various dopant concentrations. Plots 410, 412, 414 and 416 show the Casimir force as a function of plate spacing for plates formed from crystalline silicon that is doped with donor phosphorus at concentrations of: $0.011 \times 10^{19}$ cm$^{-3}$, $0.52 \times 10^{19}$ cm$^{-3}$, $10 \times 10^{19}$ cm$^{-3}$ and $3.8 \times 10^{21}$ cm$^{-3}$, respectively. High dopant concentrations generate more free charge carriers resulting in an increase in the Casimir force. More energy is, however, typically required to generate such larger numbers of free charge carriers such that there may be no benefit to using ultra-heavily doped materials.

In some embodiments, operation 302 is implemented by directly altering physical factor $Y_i$. Continuing with the previous example wherein the altered physical factor is the concentration of free charge carriers, that concentration is directly altered, in one embodiment, by illuminating Casimir force-generating boundaries $P_1$ and $P_2$. In another embodiment, the concentration of free charge carriers is directly altered by injecting charge to boundaries $P_1$ and $P_2$. Various other ways known to those skilled in the art to directly affect the free carrier concentration may suitably be used to implement operation 302.

In other embodiments, operation 302 is implemented by indirectly altering physical factor $Y_i$, such as by altering environmental factor $X_j$ that affects the physical factor $Y_i$. One such readily altered environmental factor that is suitable for indirectly altering physical factor $Y_i$ is temperature. In the specific example of the concentration of free charge carriers as the altered physical factor $Y_i$, changing the temperature of Casimir force-generating boundaries $P_1$ and $P_2$ causes thermal ionization of donor dopants and a consequent increase in carrier concentration.

The phrase "altering a physical factor," as used in this Specification, is meant to encompass both direct alteration of physical factor $Y_i$, as well as indirect alteration of physical factor $Y_i$, such as by altering environmental factor $X_j$ that affects the physical factor $Y_i$, as described above. As used herein, the phrase "altering a physical factor" explicitly excludes changing the distance between Casimir force-generating boundaries $P_1$ and $P_2$. Moreover, unless otherwise indicated, the phrase "physical factor" is meant to include physical factors, and environmental factors that affect the physical factors.

Continuing with the description of illustrative method 300, distance s between the two Casimir force-generating boundaries $P_1$ and $P_2$ is changed in operation 304. With reference to cycle 200, operation 304 corresponds to state change 204 (i.e., A→B). The manner in which operation 304 is accomplished depends, of course, on the apparatus chosen for implementing method 300. An embodiment of an apparatus suitable for implementing method 300 is described later in this Specification in conjunction with FIGS. 5–11.

In operation 306, the physical factor(s) $Y_i$ that were altered in operation 302 are again altered. In one embodiment, the altered physical factors(s) are advantageously returned to their original value(s) (e.g., the value(s) at point D). Such an embodiment corresponds to state change 306 (i.e., B→C) depicted in cycle 200 (FIG. 2).

In other embodiments, the altered physical factor(s) are altered in an appropriate "direction," but not returned to their original value(s). For example, with reference to FIG. 2, in other embodiments, the physical factor(s) are altered such that the Casimir force decreases as in the transformation B→C, but the alteration does not fully reduce the Casimir force to the value at point C such that the physical factor is not returned to its original value. Rather, the state change results in a value of the Casimir force that is more or less than the value at point C. And, in a further embodiment, different physical factor(s) are altered in operation 306 than were altered in operation 302.

In operation 308, distance s between the two boundaries P₁ and P₂ is again changed. In particular, the movable surface is advantageously returned to its original position. Thus, at the completion of operation 308, distance s between the boundaries is advantageously the same as it was before they were moved in operation 304. Operations 302–308 result in the extraction of energy accessed via Casimir force-generating boundaries. Operations 310A, 310B and 310C, described later in this Specification, pertain to the disposition of such extracted energy.

Illustrative method 300 is described further later in this Specification with reference to FIGS. 6–11, which depict an embodiment of illustrative energy extraction apparatus 500 (see FIG. 5) carrying out illustrative method 300.

Illustrative energy extraction apparatus 500 is operative, when carrying out illustrative method 300, to extract energy from a source force field, such as the quantum electromagnetic field. Illustrative energy extraction apparatus 500 comprises energy access system 502 and energy transformation system 532 that interact or cooperate with one another, as indicated by bi-directional indicator 506.

Energy access system 502 provides access to a source force field, such as the quantum electromagnetic field (QED interpretation). Energy transformation system 532 transforms the accessed energy to a convenient form for exploitation (e.g., electrical energy, kinetic energy, etc.), among other functions. In some embodiments, energy access system 502 and energy transformation system 532 include, collectively, all elements that are necessary for carrying out method 300.

Energy access system 502 advantageously comprises Casimir force-generating boundaries 522 and 520. Energy from a source force field is accessed via Casimir force-generating boundaries 522 and 520. Energy transformation system 532 advantageously includes a first device/system 540 and a second device/system 534 that, independently of one another, are operable to controllably affect the Casimir force accessed through energy access system 502.

In the illustrative embodiments, first device 540 is operable to alter a physical factor of energy access system 502 that affects the Casimir force. In embodiments in which energy access system 502 comprises Casimir force-generating boundaries 522 and 520, device 540 advantageously alters a physical factor of at least one of boundaries 522 and 520. In some embodiments, device 540 is a laser.

In the illustrative embodiments, second device 534 is operable to controllably change the distance between two Casimir force-generating boundaries. In some embodiments, device 534 is a controlled power supply.

The particular physical configuration of energy transformation system 532 varies with the nature of the energy transformation (e.g., transformation to electrical energy, transformation to kinetic energy, etc.). FIGS. 6–9 illustrate one specific embodiment of energy extraction apparatus 500, wherein energy transformation system 532 is physically configured to transform energy accessed via Casimir force-generating boundaries to electrical energy.

In the embodiment depicted in FIG. 6, energy extraction apparatus 500 comprises four plates 518, 520, 522, 524, interrelated as shown. In the embodiment depicted in FIG. 6, energy access system 502 comprises plates 522 and 520. In particular, plates 522 and 520 function as the Casimir force-generating boundaries.

Plates 520 and 518 are physically separated and electrically insulated via standoffs 526, plates 522 and 520 are physically separated and electrically insulated via standoffs 528, and plates 524 and 522 are physically separated and electrically insulated via standoffs 530. Plate 522 is movable upwardly and downwardly, while plates 518, 520 and plate 524 are non-moving. Standoffs 526, 528 and 530 comprise an electrically insulating material, such as, without limitation, silicon oxide and silicon nitride.

Energy extraction device 500 further includes energy transformation system 532. In the illustrated embodiment, energy transformation system 532 is physically configured to carry out operation 310A of method 300, wherein energy accessed via Casimir force-generating boundaries is transformed to electrical energy and stored.

Energy transformation system 532 includes plates 518 and 524, controlled bi-directional power supply 534 that is electrically connected to each plate 518, 520, 522 and 524, resistor 536 that represents the internal resistance of bi-directional power supply 534, switch 538 and radiation source 540, electrically connected as shown. In some embodiments, radiation source 540 is a source of monochromatic radiation such as a laser.

In embodiments in which the physical factor is altered via a radiation source, such as radiation source 540, and (1) the altered physical factor is the concentration of free charge carriers and (2) the Casimir force-generating boundaries 522 and 520 are doped with an impurity to supplement free charge carrier generation, then the radiation source is advantageously tuned to the ionization level of the impurity. Radiation source 540 is powered by a controlled power supply (not shown).

When switch 538 is closed, controlled bi-directional power supply 534 is operable to supply charge to and receive charge from, as appropriate, a first capacitive structure defined by side 524a of plate 524 and side 522b of plate 522. Further, controlled bidirectional power supply 534 is operable to supply charge to and receive charge from, as appropriate, a second capacitive structure defined by side 520b of plate 520 and side 518a of plate 518.

The illustrative arrangement of four plates 518, 520, 522 and 524 depicted in FIG. 5 results in an equal distribution of charge on facing sides 524a and 522b of respective plates 524 and 522, and on facing sides 520b and 518a of respective plates 520 and 518. These sides, which must be conductive, receive substantially all the charge with substantially no charge being received by facing sides 522a and 520a of respective plates 522 and 520. This is depicted in FIG. 5 by the presence of "+" and "−" on the appropriate sides of plates 518, 520, 522 and 524. Plates 524 and 518 are advantageously maintained at the same potential, and plates 522 and 520 are advantageously maintained at the same potential. Given the illustrative arrangement, electrostatic forces between plates 522 and 520 are kept quite low and can, therefore, be neglected.

Plates 522 and 520 comprise a material that is selected, for example, based on the physical factor that is going to be altered in accordance with method 300. Suitable materials for an embodiment wherein the concentration of free charge carriers is altered have already been described. It is within the capabilities of those skilled in the art, using available reference materials and published articles, to suitably select materials as a function of physical factor being altered. In most cases, simply experimentation is advantageously performed to confirm materials selection and to identify, as desired, a preferred material.

Since, in the illustrated embodiment, surfaces and 522b and 520b are conductive, and since, in some embodiments, plates 522 and 520 are not conductive, conductivity must be imparted to surfaces 522b and 520b. Conductivity may be imparted, for example, by coating those surfaces with a conductive material (e.g., aluminum, etc.). Plates 524 and 518 comprise a conductive material, or, in some embodiments, conductivity is imparted by depositing a conductive layer on the plates or appropriately doping the plates.

The "stack" of spaced plates 518, 520, 522 and 524 comprising energy extraction device 500 of FIG. 6 is formed using techniques that are now quite familiar to those skilled in the art. In some embodiments, using such conventional techniques, hundreds, thousands or even millions of discrete apparatuses 500 are formed on a single substrate to provide a suitable amount of energy output as required for a given application.

In one embodiment, the stack of spaced plates is formed using surface micromachining technologies. Typical of such technology is SUMMiT V Technology offered by Sandia National Laboratories (www.mdl.sandia.gov/micromachine/summit5.html). SUMMiT V is a five-level polycrystalline silicon surface micromachining process (one ground plane and four mechanical or releasable layers). Like most MEMS (micro electro mechanical systems) fabrication technology, the SUMMiT V process involves alternately depositing a film, photolithographically patterning the film, and then chemical etching.

Successive mechanical layers (i.e., the polysilicon layers) are separated by, for example, silicon oxide layers. At the end of the fabrication process, the silicon dioxide is chemically removed, thereby "releasing" the polycrystalline silicon layers such that are movable, as desired. The nominal spacing and thickness of layers is as follows. The first layer, identified as "Poly 0," is the ground plane layer of polysilicon having a nominal thickness of 0.3 microns. The next layer, "Poly 1," has a thickness of 1 micron. The nominal separation distance between Poly 1 and Poly 0 is 2 microns. The next layer, "Poly 2," has a nominal thickness of 1.5 microns and has a nominal separation distance of 0.5 microns from Poly 1. "Poly 3," which is the next layer, has a nominal thickness of 2.25 microns and a nominal separation distance of 2 microns from Poly 2. Finally, "Poly 4" has a nominal thickness of 2.25 microns and a nominal separation distance of 2 microns from Poly 3.

By way of example, in one embodiment of the fabrication of energy extraction apparatus 500 of FIG. 6 via the SUMMit V process, the Poly 3 layer will be used to fabricate plate 524, the Poly 2 layer will be used for plate 522, the Poly 1 layer will be used for plate 520 and the poly 0 layer will be used to fabricate plate 518. Since only three "mechanical" layers are required for the apparatus of FIG. 6, the Poly 4 layer is not used. To immobilize plates 524 and 520, layer thickness can be increased or, alternatively, braced, as appropriate.

Many other MEMS foundries are available for the fabrication of a stacked structure such as apparatus 500. Those skilled in the art will know of such foundries and be able to suitably select one by matching their capabilities to the fabrication requirements of the device.

Radiation source 540 is advantageously formed separately from the stack of plates 518, 520, 522 and 524 according to well-known methods as is appropriate for the particular physical configuration of the radiation source (e.g., laser, etc.). Electrical elements (e.g., switch 538, the wire traces, etc.) can be fabricated during stack formation as part of a surface micromachining process, or fashioned separately therefrom by standard processing techniques. The various elements are then appropriately packaged to form the complete energy extraction device 500.

Before carrying out method step 302, switch 538 is closed and a potential difference $V_b$ is applied to the plates while plate 522 is at a distance $s_D$ from the plate 520. For pedagogical purposes, this state, which corresponds to point D in FIG. 2, is considered to be a state of mechanical equilibrium for the system.

FIG. 6 depicts transducer 500 at the completion of method step 302 (i.e., at the completion of state change 202), which corresponds to point A in FIG. 2. Recalling the earlier description, step 302 requires altering a physical factor $Y_i$. In the illustrative embodiments, this step is performed by activating radiation source 540. Radiation source 540 is advantageously tuned to the ionization level of impurities in plates 520 and 522. As a consequence, illuminating the facing sides 520a and 522a of respective plates 520 and 522 causes an increase in the concentration of free charge carriers in plates 520 and 522, and, hence, an increase in the Casimir force.

The illumination is advantageously slowly increased so that the increase in the Casimir force occurs as a series of very small changes. According to engine cycle 200, plate 522 is substantially stationary as the Casimir force is increased in step 302. But as the Casimir force increases, there will be a tendency for plates 520 and 522 to be drawn closer together. To counteract this tendency, the electrostatic force between plates 524 and 522 is increased by small increases in potential $V_b$. Thus, there is a flow of charge from power supply 534 toward transducer 500, as indicated by the flow of current toward the positive electrode of the power supply 534. At the completion of step 302, radiation source 540 remains on but the intensity of illumination is now held constant.

FIG. 7 depicts transducer 500 at the completion of method step 304 (i.e., the end of state change 204), which corresponds to point B in FIG. 2. As depicted in FIG. 7, plate 522 has moved closer to plate 520. This decrease in distance between plates 522 and plate 520 increases the Casimir force. To move plate 522 closer to plate 520, the voltage delivered by power supply 534 is slightly decreased. But, to maintain plate 522 in quasi-static equilibrium, charge continues to flow as distance s between plates 522 and 520 decreases until it reaches spacing $s_B$.

Figure 8:
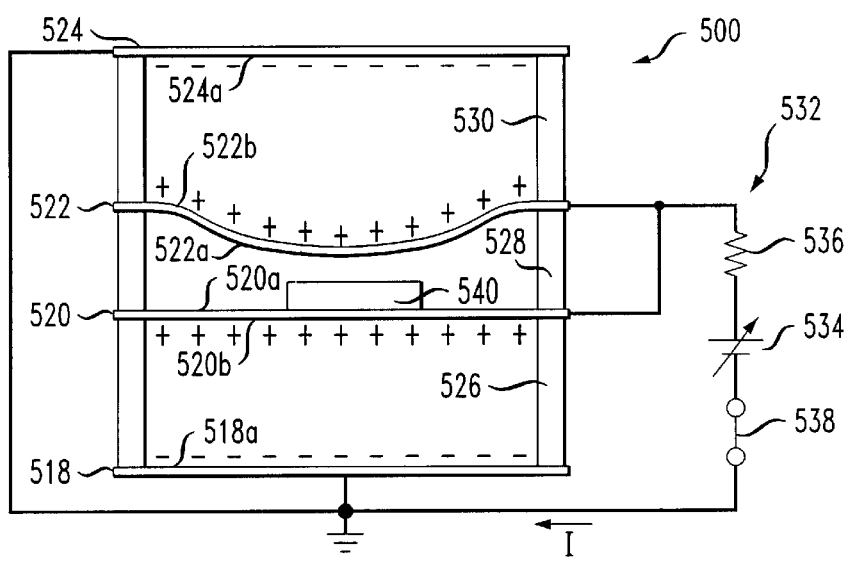
FIG. 8 depicts the energy extraction apparatus shown in FIG. 6, but depicts the apparatus at the end of a third state change in accordance with the illustrative cycle of FIG. 2 and at the end of a third step in accordance with the illustrative method of FIG. 3.

FIG. 8 depicts transducer 500 at the completion of method step 306 (i.e., the end of state change 206), which corresponds to point C in FIG. 2. As will be recalled, in step 306, distance s between the plates 522 and 520 is held substantially constant while the altered property is advantageously returned to its initial condition. In the illustrated embodiment, step 306 is effected by decreasing illumination from radiation source 540 so that the free carrier concentration, and hence the Casimir force, decrease.

Since the Casimir force decreases as a result of step 306, but the distance between the plates is held substantially constant, excess charge must be drained from plates 524 and 522. The excess charge is drained since, if it were not, plate 522 would be drawn toward plate 524 (because the mutual electrostatic attraction between plates 524 and 522 is now greater than the mutual attraction between plates 522 and 520 due to the Casimir force). As illustrated in FIG. 8, current flow reverses, and energy is returned to bidirectional power supply 534.

Figure 9:
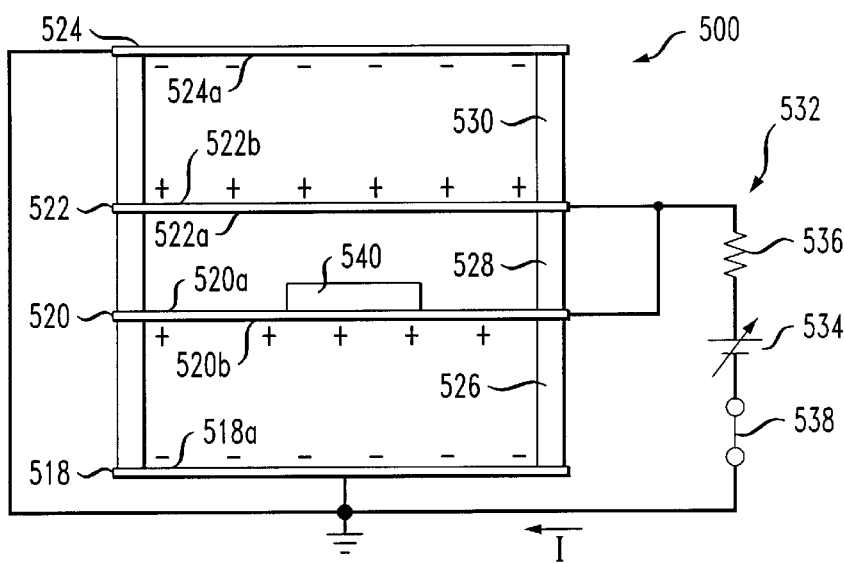
FIG. 9 depicts the energy extraction apparatus shown in FIG. 6, but depicts the apparatus at the end of a fourth state change in accordance with the illustrative cycle of FIG. 2 and at the end of a fourth step in accordance with the illustrative method of FIG. 3.
Figure 10:
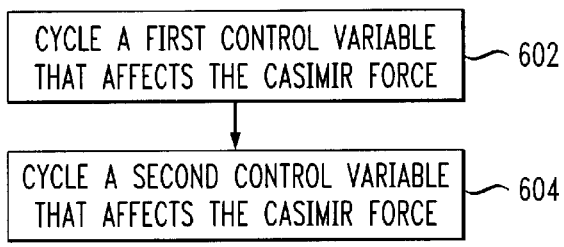
FIG. 10 depicts a further illustrative embodiment of a method for energy extraction in accordance with the present teachings.

FIG. 9 depicts transducer 500 at the completion of method step 308 (i.e., at the end of state change 208), which corresponds to point D in the cycle. In the present example, at point D, transducer 500 has completed a cycle.

As illustrated in FIG. 9, in step 308, plate 522 is moved away from plate 520, advantageously returning to its original position. This is accomplished by slightly increasing the voltage delivered by power supply 534. As the distance between plates 522 and 520 is increased, the Casimir force decreases. Additional charge is drawn off plates 524 and 522 to maintain quasi-static equilibrium. As in the previous step, charge is returned to power supply 534.

In view of the foregoing description, it will be appreciated that illustrative cycle 200 can be described in terms of the cycling of two independent control variables, both of which affect the Casimir force. Thus, in a further illustrative embodiment of a method 600 in accordance with the present teachings (see FIG. 10), a first control variable that affects the Casimir force is cycled as per operation 602 and, in operation 604, a second control variable that affects the Casimir force is cycled. Such cycling effects the state changes (i.e., state changes 202, 204, 206 and 208 defining engine cycle 200.

In the illustrative embodiments depicted herein, the first control variable alters a physical factor that affects the Casimir force, while the second control variable controls movements of the Casimir force-generating boundaries.

By way of example, in an embodiment in which the physical factor is the concentration of free charge carriers, the first control variable is, in three different illustrative embodiments: (1) an amount of illumination; (2) an amount of thermal radiation; and (3) an amount of injected charge.

In the illustrative embodiments, voltage is used as the second control variable. In particular, voltage is used to change the distance between the boundaries (e.g., state changes 204 and 208), or, alternatively, is used to prevent the boundaries from moving, when the first control variable is used to alter a physical parameter (e.g., state changes 202 and 206).

Figure 11A:
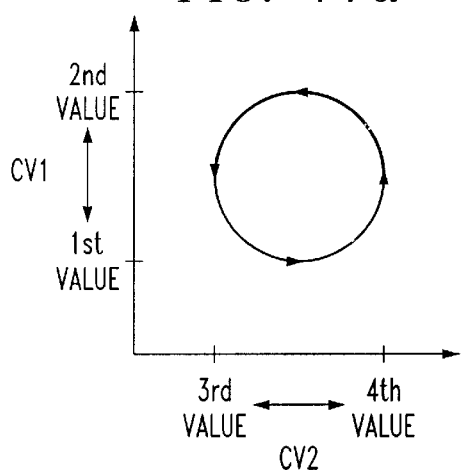
FIGS. 11a–11e depict the cycling of two control variables in an illustrative method in accordance with the present teachings.
Figure 11B:
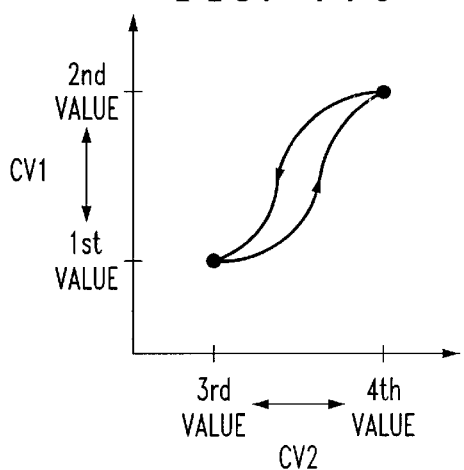
Figure 11C:
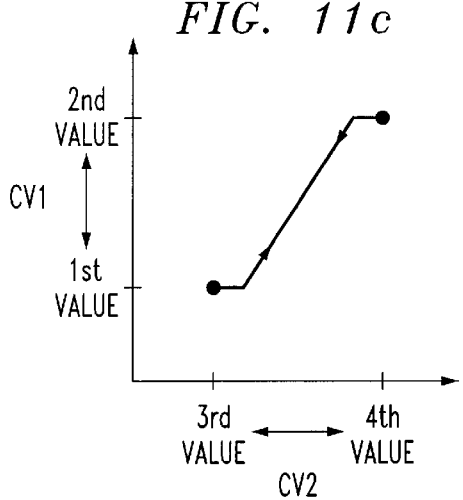
Figure 11D:
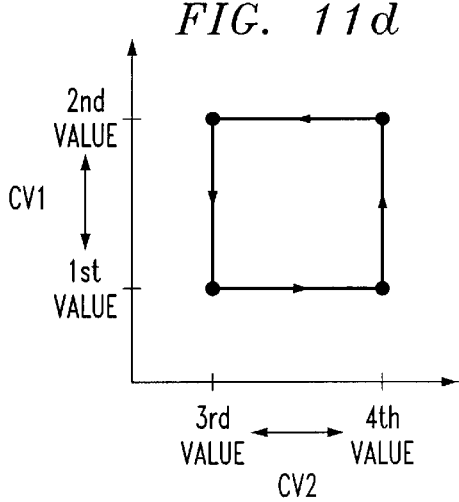
Figure 11E:
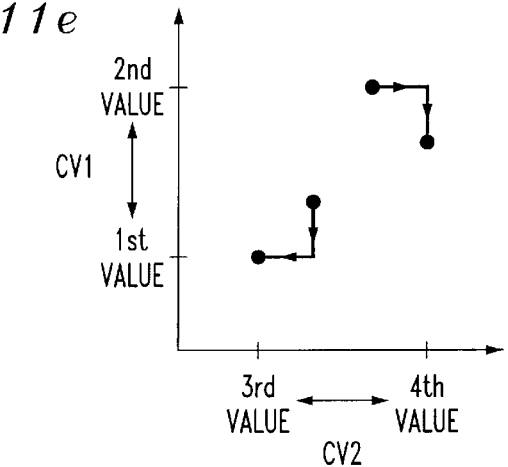

FIG. 11*a* depicts, figuratively, the cycling of the first and second control variables to effect desired state changes in engine cycle 200. The first control variable CV1 is cycled between a first value and a second value, and the second control variable CV2 is cycled between a third value and a fourth value. Generally, the cycle of each control variable is described by some function $F_N(T)$:

$$CV1 = F_1(T);\qquad [10]$$

and $$CV2 = F_2(T).$$

The cycling of the two control variables is not necessarily expected to define the circular shape depicted in FIG. 11*a* or any of the shapes shown in FIGS. 11*b*–11*e*. Such plots are illustrative and are provided simply as indication of some of the many possible ways in which first control variable CV1 and a second control variable CV2 may cycle to accomplish the desired state changes.

In FIGS. 11*a*–11*e*, the first and second control variables are cycling with the same repetition rate (i.e., at the same frequency). In other embodiments, the control variables cycle with different repetition rates. The plots describing the cycling of the control variables in embodiments in which the repetition rates differ will be relatively complex functions.

In the illustrative embodiments, energy transformation system 532 is physically configured to store energy accessed via the Casimir force-generating plates, after transformation, as electrical energy in bi-directional power supply 534. In this configuration, energy extraction apparatus 500 is practicing operation 310A of method 300. In another embodiment (not shown), the same method step is practiced, but apparatus 500 includes separate power source and power storage (i.e., for receiving transformed energy) facilities.

In another embodiment of method 300, operation 310B is practiced wherein extracted energy is delivered to a consumer of electrical energy for use thereby. In some embodiments, the energy is delivered from storage, such that, with minor modification (i.e., appropriate electrical connection to the electrical consumer), the physical configuration of the energy transformation system 532 depicted in FIGS. 6–9 may suitable be used.

In yet an additional embodiment of operation 310B, energy is delivered to a consumer as it becomes available from the method steps, such that energy transformation system 532 must be suitably modified by changes that are within the capabilities of those skilled in the art. This embodiment is depicted in the simplified schematic of FIG. 11 wherein energy extraction device 500 is electrically connected to electrical device 650. Energy accessed via Casimir force-generating boundaries that is transformed to electrical energy is then used to power device 650.

In accordance with operation 310C of yet a further embodiment of illustrative method 300, energy accessed via Casimir force-generating boundaries is used to mechanically actuate a device. In one embodiment, this is accomplished by operatively linking the movable Casimir force-generating boundary to the device so that the device is actuated by movement of the movable boundary. Such an embodiment will again require modifications to energy transformation system 532 that are within the capabilities of those skilled in the art.

Figure 12:
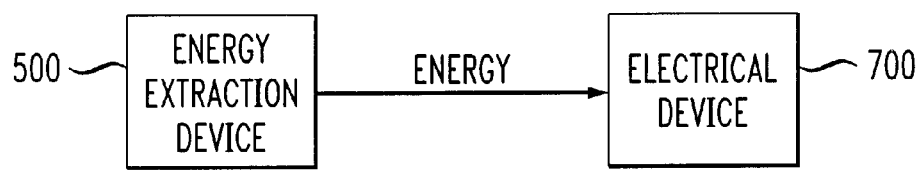
FIG. 12 depicts an arrangement whereby energy that is recovered is used to drive a device that requires electricity to operate.
Figure 13:
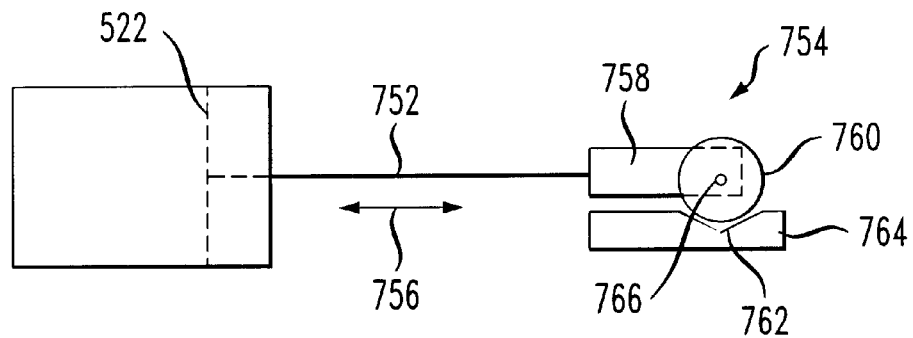
FIG. 13 depicts an arrangement whereby recovered energy is used as an actuating force.

For example, as depicted in the simplified schematic of FIG. 12, energy extraction device 500 is operatively engaged to micro-mechanical device 754 by linkage 752. Micro-mechanical device 754 functions as an optical switch wherein shutter 758 is moved into or out of the path of an optical signal (not shown) traveling through core 766 of fiber 760. Shutter 758 moves responsive to movements of plate 522 along direction 756. Movements of plate 522 responsive to the present method are transmitted to shutter 758 via linkage 752.

When shutter 758 is in the path of an optical signal (i.e., when the shutter intersects core 766), further propagation of the optical signal is halted. When shutter 758 is out of the path of the optical signal, the signal passes unimpeded.

It is to be understood that the above-described embodiments are merely illustrative of the invention and that many variations may be devised by those skilled in the art without departing from the scope of the invention and from the principles disclosed herein. It is therefore intended that such variations be included within the scope of the following claims and their equivalents.

I claim:

1. A method comprising:
   adding energy to at least one of two spaced Casimir force-generating boundaries;
   decreasing a separation between said two spaced Casimir force-generating boundaries to a first distance;
   decreasing a rate by which said energy is added to said at least one Casimir force-generating boundary; and
   increasing said distance between said two spaced Casimir force-generating boundaries to a second distance.

2. The method of claim 1 wherein said step of adding energy comprises preventing said two spaced Casimir force-generating boundaries from moving relative to one another.

3. The method of claim 1 wherein said step of adding energy comprises illuminating said at least one Casimir force-generating boundary.

4. The method of claim 1 wherein said step of adding energy comprises heating said at least one Casimir force-generating boundary.

5. The method of claim 1 wherein said step of adding energy comprises adding said energy in a series of small increments, wherein a rate by which said energy is added is successively increased.

6. The method of claim 5 wherein said step of decreasing a distance further comprises holding said rate constant.

7. The method of claim 1 wherein said step of decreasing a rate further comprises maintaining said first distance.

8. The method of claim 1 wherein said step of decreasing a rate by which said energy is added comprises stopping the addition of energy.

9. A method comprising:

drawing a first boundary toward a second boundary, wherein physical factors affecting a Casimir force that arises between said first boundary and said second boundary have a first set of values; and pulling said first boundary and said second boundary away from one another when said physical factors have a second set of values;

wherein said first set of values results in a greater magnitude of said Casimir force than said second set of values for any given separation between said first boundary and said second boundary.

10. The method of claim 9 wherein said step of drawing comprises imparting said first set of values to said physical factors by illuminating at least one of said first boundary and said second boundary.

11. The method of claim 10 wherein said step of pulling comprises reducing an intensity of said illumination.

12. The method of claim 9 wherein said step of drawing comprises imparting said first set of values to said physical factors by applying heat to at least one of said first boundary and said second boundary.

13. The method of claim 12 wherein said step of pulling comprises reducing said applied heat.

14. The method of claim 9 further comprising the step of storing energy accessed via said first boundary and said second boundary.

15. The method of claim 9 further comprising delivering to an electrical device energy accessed via said first Casimir force-generating boundary and said second Casimir force-generating boundary.

16. A method comprising:

cycling a first control variable that affects a Casimir force between a first Casimir force-generating boundary and a second Casimir force-generating boundary, wherein said first control variable is cycled between a first value and a second value; and cycling a second control variable that affects said Casimir force between said first Casimir force-generating boundary and said second Casimir force-generating boundary, wherein said second control variable is cycled between a third value and a fourth value.

17. The method of claim 16 wherein said first control variable affects a physical factor that affects said Casimir force.

18. The method of claim 17 wherein said physical factor is a concentration of free charge carriers in at least one of said first Casimir force-generating boundary and said second Casimir force-generating boundary.

19. The method of claim 16 wherein said first control variable is an illumination of at least one of said first Casimir force-generating boundary and said second Casimir force-generating boundary.

20. The method of claim 16 wherein said second control variable is a voltage that is operative to change a distance between said first Casimir force-generating boundary and said second Casimir force-generating boundary.

21. The method of claim 16 wherein said first control variable and said second control variable are cycled at a same repetition rate.

* * * * *